(12) United States Patent
Scarfutti et al.

(10) Patent No.: US 11,449,312 B2
(45) Date of Patent: Sep. 20, 2022

(54) SYSTEM AND METHOD FOR EXECUTING A PROCESS WORKFLOW

(71) Applicant: The Toronto-Dominion Bank, Toronto (CA)

(72) Inventors: Joseph Vincent Scarfutti, Brooklyn, NY (US); Christian Caberoy De La Peña, Chester, NY (US); Michael James Gosnell, Toronto (CA); Bogdan Petrescu, Mississauga (CA); Ridhima Sakhuja, East Brunswick, NJ (US); Mikayla Dale Wronko, Vaughan (CA); Oksana Dranka, Toronto (CA); Ting Zhou, Aurora (CA)

(73) Assignee: The Toronto-Dominion Bank, Toronto (CA)

( * ) Notice: Subject to any disclaimer, the term of this patent is extended or adjusted under 35 U.S.C. 154(b) by 85 days.

(21) Appl. No.: 17/248,060

(22) Filed: Jan. 7, 2021

(65) Prior Publication Data
US 2022/0214862 A1 Jul. 7, 2022

(51) Int. Cl.
*G06F 8/20* (2018.01)
*G06Q 10/06* (2012.01)
(Continued)

(52) U.S. Cl.
CPC ............ *G06F 8/20* (2013.01); *G06F 16/9024* (2019.01); *G06Q 10/067* (2013.01); *G06Q 10/06316* (2013.01)

(58) Field of Classification Search
CPC . G06F 8/20; G06F 16/9024; G06Q 10/06316; G06Q 10/067
(Continued)

(56) References Cited

U.S. PATENT DOCUMENTS 8,307,294 B2 11/2012 Luo et al.
8,656,352 B2 2/2014 Szpak et al.
(Continued)

OTHER PUBLICATIONS

Brosey, W. D. et al., "Grand challenges of enterprise integration," ETFA 2001. 8th International Conference on Emerging Technologies and Factory Automation. 2001, pp. 221-227 vol. 2.
(Continued)

*Primary Examiner* — Chuck O Kendall
(74) *Attorney, Agent, or Firm* — CPST Intellectual Property Inc.; Brett J. Slaney

(57) ABSTRACT

A system and method are provided for executing process workflows. The method includes obtaining via a communications module, a representation of a workflow as a graph, the graph including a plurality of interconnected workflow tasks. The method also includes storing the graph in a graph database, navigating through the workflow tasks in the graph as the process is executed, and publishing via the communications module, a workflow state change with a topic for the current workflow task. The method also includes receiving via the communications module, a document for the current workflow task, wherein a state of the process is implied by the topic position in the graph, and wherein the topic determines at least one microservice to be employed. The method also includes having at least one workflow task associated with the current workflow task executed by instructing a corresponding one or more microservices via the communications module.

20 Claims, 14 Drawing Sheets

(51) Int. Cl.
*G06F 16/901* (2019.01)
*G06F 9/44* (2018.01)

(58) Field of Classification Search
USPC .................................................. 717/132, 144
See application file for complete search history.

(56) References Cited

U.S. PATENT DOCUMENTS

| | | |
|---|---|---|
| 10,261,757 B2 | 4/2019 | Harrill et al. |
| 10,423,393 B2 | 9/2019 | Lam et al. |
| 10,423,445 B2 | 9/2019 | Mishra |
| 10,423,912 B2 | 9/2019 | Garcia et al. |
| 10,692,030 B2 | 6/2020 | Haligowski et al. |
| 2009/0006997 A1 | 1/2009 | Jiang et al. |
| 2013/0152038 A1 | 6/2013 | Lim et al. |
| 2016/0259534 A1 | 9/2016 | Simons et al. |
| 2019/0205792 A1 | 7/2019 | Huang |
| 2019/0392617 A1 | 12/2019 | Laetham |
| 2020/0111041 A1 | 4/2020 | Levine et al. |
| 2020/0201525 A1 | 6/2020 | Chin |
| 2020/0242530 A1 | 7/2020 | Ward, IV |
| 2021/0182996 A1* | 6/2021 | Cella .................... G06F 16/254 |

OTHER PUBLICATIONS

O'Hara, John, "Toward a Commodity Enterprise Middleware", ACM Queue. vol. 5., No. 4., pp. 48-55 (2007).
Fowler, Martin; Command Query Responsibility Segretation; https://martinfowler.com/bliki/CQRS/html.

* cited by examiner

SYSTEM AND METHOD FOR EXECUTING A PROCESS WORKFLOW

TECHNICAL FIELD

The following relates generally to executing process workflows.

BACKGROUND

As digital systems and user or process requirements for these systems become more complicated and demanding, business process management becomes more challenging and complicated to implement. It is typically found that few (if any) existing tools are capable of adapting to generic and intrinsic items normally required in these business processes. For example, a business process may require sequential checks, gates, and approvals as well as data enrichment, aggregation, and appending. These tasks can require customize programming and can increase complexities in the end product or service. Other challenges can be introduced because of document parsing, document matching, data distribution and transmission, time series analyses, and web publishing.

BRIEF DESCRIPTION OF THE DRAWINGS

Embodiments will now be described with reference to the appended drawings wherein.

DETAILED DESCRIPTION

Figure 1:
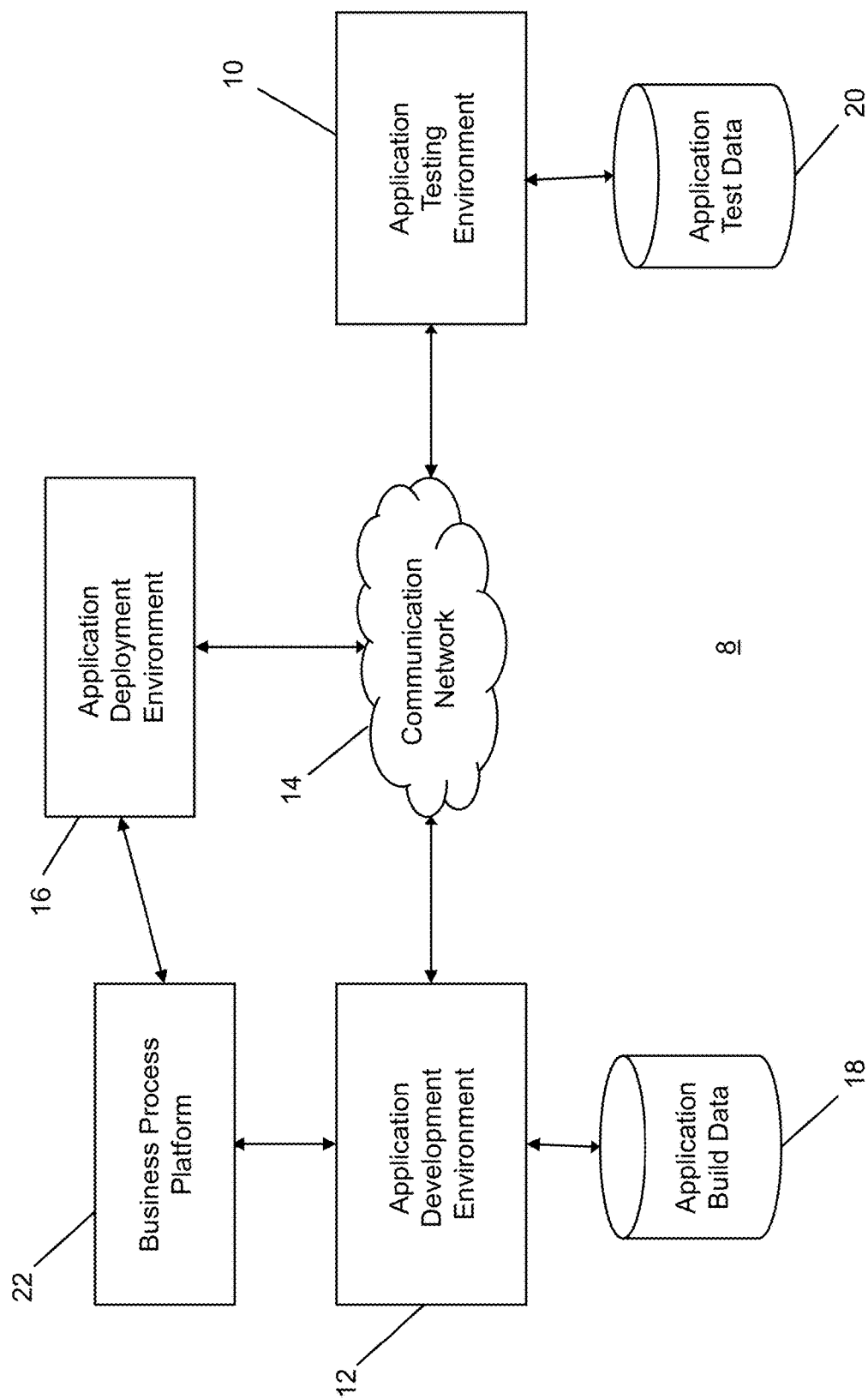
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is found that many items in a business process can be generic and intrinsic to several processes and applications, particularly within an organization. These can include, for example, business process management, sequential checks/gates/approvals, data enrichment/aggregation/appending, document parsing, document matching, data distribution and transmission, time series analyses, web publishing, etc. Mapping microservices for such business functions can facilitate cross-skill understanding and development. Moreover, this can provide modularity that allows future challenges and opportunities to be met quickly and efficiently using agnostic microservices that can be used to flexibly onboard functional extensions or changes to a process.

A state machine system or "platform" is described herein, which abstracts process orchestration from the user via a state machine and provides a user interface (UI) design tool to allow a business-function oriented approach to workflow design and representation as a graph. The systems described herein can include a streaming distribution layer that offers a normalized paradigm for function integration and onboarding, and includes multiple tiers for resiliency, performance and recovery. The system can rely on a number of functional business services, which can be implemented as microservices.

With this system, a business process can be created and stored as a graph. Also, the system can employ dynamic routing, functional declarations for application onboarding, and a standard integration paradigm to facilitate federated building of a microservice layer. The system can also persist messages in a queue and employ a database for message recovery. The UI on top of the system provides for low- or no-code implementation of a process from building blocks associated with the graph structure.

The following generally relates to executing process workflows, e.g., in implementing a digital application, in particular for designing, implementing, and executing business process workflows using a workflow graph stored in a graph database.

Certain example systems and methods described herein are able to execute process workflows. In one aspect, there is provided a device for executing process workflows. The device includes a processor, a communications module coupled to the processor, and a memory coupled to the processor. The memory stores computer executable instructions that when executed by the processor cause the processor to obtain via the communications module, a representation of a workflow as a graph, the graph comprising a plurality of interconnected workflow tasks. The computer executable instructions, when executed, also cause the processor to store the graph in a graph database, navigate through the workflow tasks in the graph as the process is executed, and publish via the communications module, a workflow state change with a topic for the current workflow task. The computer executable instructions, when executed, also cause the processor to receive via the communications module, a document for the current workflow task, wherein a state of the process is implied by the topic position in the graph, and wherein the topic determines at least one microservice to be employed, and have at least one workflow task associated with the current workflow task executed by instructing a corresponding one or more microservices via the communications module.

In another aspect, there is provided a method of executing process workflows. The method is executed by a device having a communications module. The method includes obtaining via the communications module, a representation of a workflow as a graph, the graph comprising a plurality of interconnected workflow tasks. The method also includes storing the graph in a graph database, navigating through the workflow tasks in the graph as the process is executed, and publishing via the communications module, a workflow state change with a topic for the current workflow task. The method also includes receiving via the communications module, a document for the current workflow task, wherein a state of the process is implied by the topic position in the graph, and wherein the topic determines at least one microservice to be employed, and having at least one workflow task associated with the current workflow task executed by instructing a corresponding one or more microservices via the communications module.

In another aspect, there is provided a non-transitory computer readable medium for executing process workflows. The computer readable medium includes computer executable instructions for obtaining via a communications module, a representation of a workflow as a graph, the graph comprising a plurality of interconnected workflow tasks. The computer readable medium also includes instructions for storing the graph in a graph database, navigating through the workflow tasks in the graph as the process is executed, and publishing via the communications module, a workflow state change with a topic for the current workflow task. The computer readable medium also includes instructions for receiving via the communications module, a document for the current workflow task, wherein a state of the process is implied by the topic position in the graph, and wherein the topic determines at least one microservice to be employed, and having at least one workflow task associated with the current workflow task executed by instructing a corresponding one or more microservices via the communications module.

In certain example embodiments, a workflow manager service can be accessed to define the workflow as the graph, and to display a currently executing workflow.

In certain example embodiments, a workflow routing service can be used to publish the workflow state change and to receive the document via a distribution cluster coupled to a group of federated microservices. A workflow navigator service can also be used to communicate between the workflow graph database and the workflow routing service to communicate with the distribution cluster.

In certain example embodiments, the server device can communicate via the communications module with a plurality of external source systems to publish documents, obtain data from files, and to obtain data from an external database.

In certain example embodiments, the server device can integrate with an application development environment to tie the process workflow to an enterprise application. The enterprise application can be provided by a financial institution.

In certain example embodiments, the server device can provide a user interface to design the workflow graph, enable predefined node types to be added and connected to each other in a graph builder work area in the user interface, enable topics to be defined at connection points in the graph, and enable selection of the topics to define inbound and outbound configurations. The server device can also provide at least one communication template to enable communications in the workflow to be defined.

In certain example embodiments, the server device can provide a dashboard for managing a plurality of workflows, and to enable designed workflows to be published.

In certain example embodiments, the server device can enable sub-workflows to be created and shared across multiple workflows designed using the user interface.

FIG. 1 illustrates an exemplary computing environment 8. In this example, the computing environment 8 may include an application testing environment 10, an application development environment 12, and a communications network 14 connecting one or more components of the computing environment 8. The computing environment 8 may also include or otherwise be connected to an application deployment environment 16, which provides a platform, service, or other entity responsible for posting or providing access to applications that are ready for use by client devices. The computing environment may also include or otherwise be connected to a business process platform 22, which provides a platform, service or other entity responsible for designing, executing, and deploying business process workflows, whether separate from or in connection with an application developed in the application development environment 12. The application development environment 12 includes or is otherwise coupled to one or more repositories or other data storage elements for storing application build data 18.

As used herein a "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance related metrics.

The application build data 18 can include any computer code and related data and information for an application to be deployed, e.g., for testing, execution or other uses. The application build data 18 can also include any computer code and related data and information for a business process workflow implemented by the business process platform 22. In this example, the application build data 18 can be provided via one or more repositories and include the data and code required to perform application testing on a device or simulator.

The application testing environment 10 may include or otherwise have access to one or more repositories or other data storage elements for storing application test data 20, which includes any files, reports, information, results, metadata or other data associated with and/or generated during a test implemented within the application testing environment 10.

The computing environment 8 may be part of an enterprise or other organization that both develops and tests applications and/or designs and implements business process workflows. In such cases, the communication network 14 may not be required to provide connectivity between the application development environment 12, the application testing environment 10, and business process platform 22, wherein such connectivity is provided by an internal network. The application development environment 12, application testing environment 10, and/or business process platform 22, may also be integrated into the same enterprise environment as subsets thereof. That is, the configuration shown in FIG. 1 is illustrative only. Moreover, the computing environment 8 can include multiple enterprises or organizations, e.g., wherein separate organizations are configured to, and responsible for, application testing and application development, and/or business process workflows. For example, an organization may contract a third-party to develop an app for their organization but perform testing internally to meet proprietary or regulatory requirements. Similarly, an organization that develops an app may outsource the testing stages, particularly when testing is performed infrequently. The application deployment environment 16 may likewise be implemented in several different ways. For example, the deployment environment 16 may include an internal deployment channel for employee devices, may include a public marketplace such as an app store, or may include any other channel that can make the app available to clients, consumers or other users.

One example of the computing environment 8 may include a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Users of applications or business processes described herein may be referred to as customers, clients, correspondents, or other entities that interact with the enterprise or organization associated with the computing environment 8 via one or more apps or workflows (which may employ one or more apps). Such users typically interact with the environment 8 using client communication devices. It may be noted that such client communication devices may be connectable to the application deployment environment 16, e.g., to download newly developed apps, to update existing apps, etc. In certain embodiments, a user may operate the client communication devices such that client device performs one or more processes consistent with what is being developed or tested in the disclosed embodiments. For example, the user may use client device to engage and interface with a mobile or web-based banking application which has been developed and tested within the computing environment 8 as herein described. In certain aspects, client communication devices can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 14 shown by way of example in FIG. 1.

Communication network 14 may include a telephone network, cellular, and/or data communication network to connect different types of client devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Referring back to FIG. 1, the computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the application development environment 12 and/or application testing environment 10. The cryptographic server may be used to protect data within the computing environment 8 (include the application build data 18 and/or application test data 20) by way of encryption for data protection, digital signatures or message digests for data integrity, and by using digital certificates to authenticate the identity of the users and entity devices with which the application development environment 12, business process platform 22, and application testing environment 10 communicate to inhibit data breaches by adversaries. It can be appreciated that various cryptographic mechanisms and protocols can be chosen and implemented to suit the constraints and requirements of the particular deployment of the application development environment 12, business process platform 22, and application testing environment 10 as is known in the art.

Figure 2:
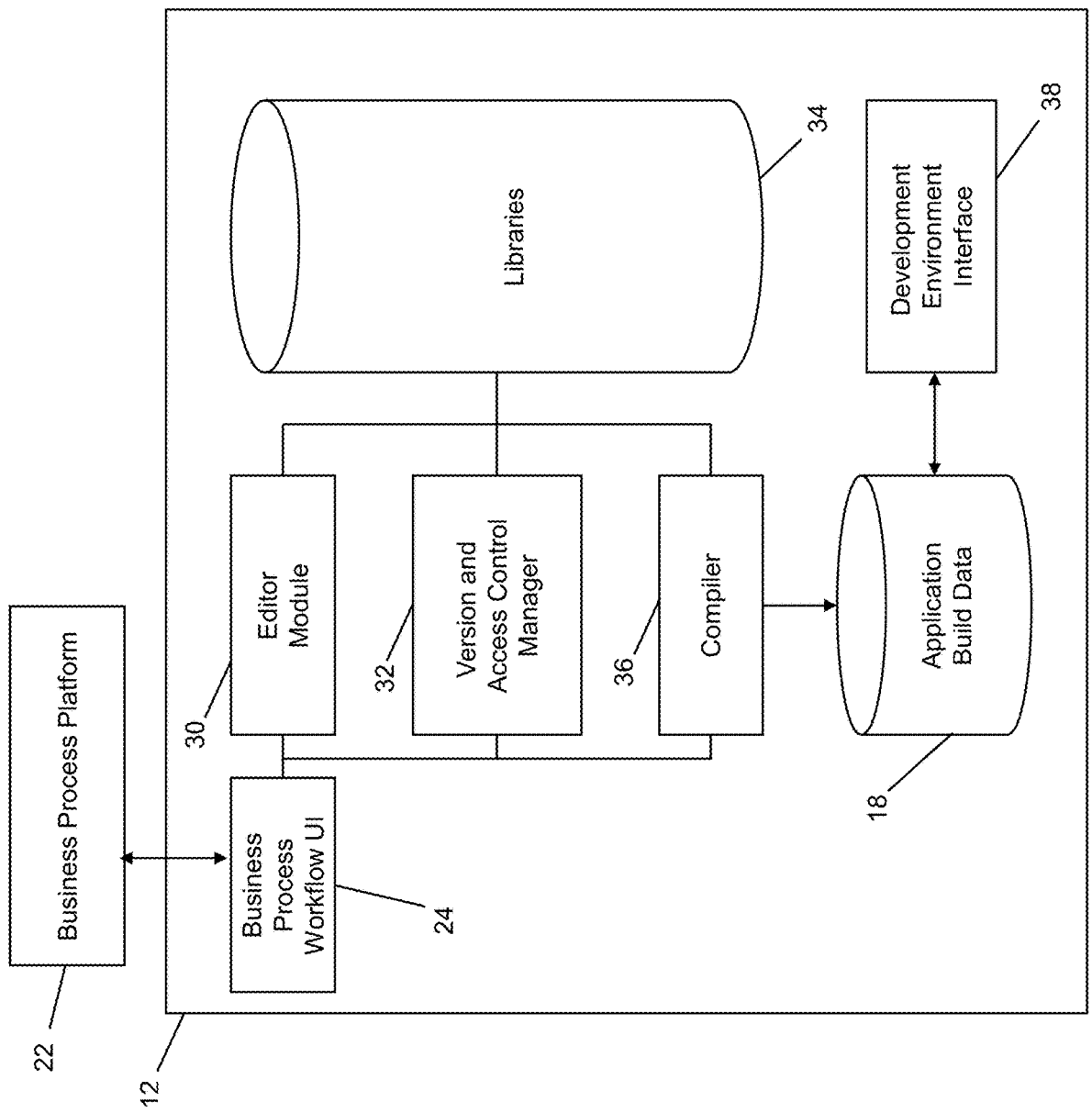
FIG. 2 is a block diagram of an example configuration of an application development environment.

In FIG. 2, an example configuration of the application development environment 12 is shown. It can be appreciated that the configuration shown in FIG. 2 has been simplified for ease of illustration. In certain example embodiments, the application development environment 12 may include an editor module 30, a version and access control manager 32, one or more libraries 34, and a compiler 36, which would be typical components utilized in application development. In this example, the application development environment 12 also includes the application build data 18, which, while shown within the environment 12, may also be a separate entity (e.g., repository) used to store and provide access to the stored build files. The application development environment 12 also includes or is provided with (e.g., via an application programming interface (API)), a development environment interface 38. The development environment interface 38 provides communication and data transfer capabilities between the application development environment 12 and the application testing environment 10 from the perspective of the application development environment 12. As shown in FIG. 2, the development environment interface 38 can connect to the communication network 14 to send/receive data and communications to/from the application testing environment 10. For example, the testing environment interface 38 can be used to provide test results to the application development environment 12 based on testing conducted in the application testing environment 10.

The editor module 30 can be used by a developer/programmer to create and edit program code associated with an application being developed. This can include interacting with the version and access control manager 32 to control access to current build files and libraries 34 while enforcing permissions and version controls. The compiler 36 may then be used to compile an application build file and other data to be stored with the application build data 18. It can be appreciated that a typical application or software development environment 12 may include other functionality, modules, and systems, details of which are omitted for brevity and ease of illustration. It can also be appreciated that the application development environment 12 may include modules, accounts, and access controls for enabling multiple developers to participate in developing an application, and modules for enabling an application to be developed for multiple platforms. For example, a mobile application may be developed by multiple teams, each team potentially having multiple programmers. Also, each team may be responsible for developing the application on a different platform, such as Apple iOS or Google Android for mobile versions, and Google Chrome or Microsoft Edge for web browser versions. Similarly, applications may be developed for deployment on different device types, even with the same underlying operating system.

While not shown in FIG. 2 for clarity of illustration, in example embodiments, the application development environment 12 may be implemented using one or more computing devices such as terminals, servers, and/or databases, having one or more processors, communications modules, and database interfaces. Such communications modules may include the development environment interface 38, which enables the application development environment 12 to communicate with one or more other components of the computing environment 8, such as the application testing environment 10, via a bus or other communication network, such as the communication network 14. While not delineated in FIG. 2, the application development environment 12 (and any of its devices, servers, databases, etc.) includes at least one memory or memory device that can include a tangible and non-transitory computer-readable medium having stored therein computer programs, sets of instructions, code, or data to be executed by the one or more processors. FIG. 2 illustrates examples of modules, tools and engines stored in memory within the application development environment 12, It can be appreciated that any of the modules, tools, and engines shown in FIG. 2 may also be hosted externally and be available to the application development environment 12, e.g., via communications modules such as the development environment interface 38.

In this example embodiment, the application development environment 12 can include, a business process workflow UI 24 that can integrate or interface with the editor module 30 to enable business process workflows to be designed and integrated with an application that is being developed. The business process workflow UI 24 can also be connectable to the business process platform 22 to allow business process workflows to communicate and/or integrate with application functionality both within an application or between multiple applications.

Figure 3:
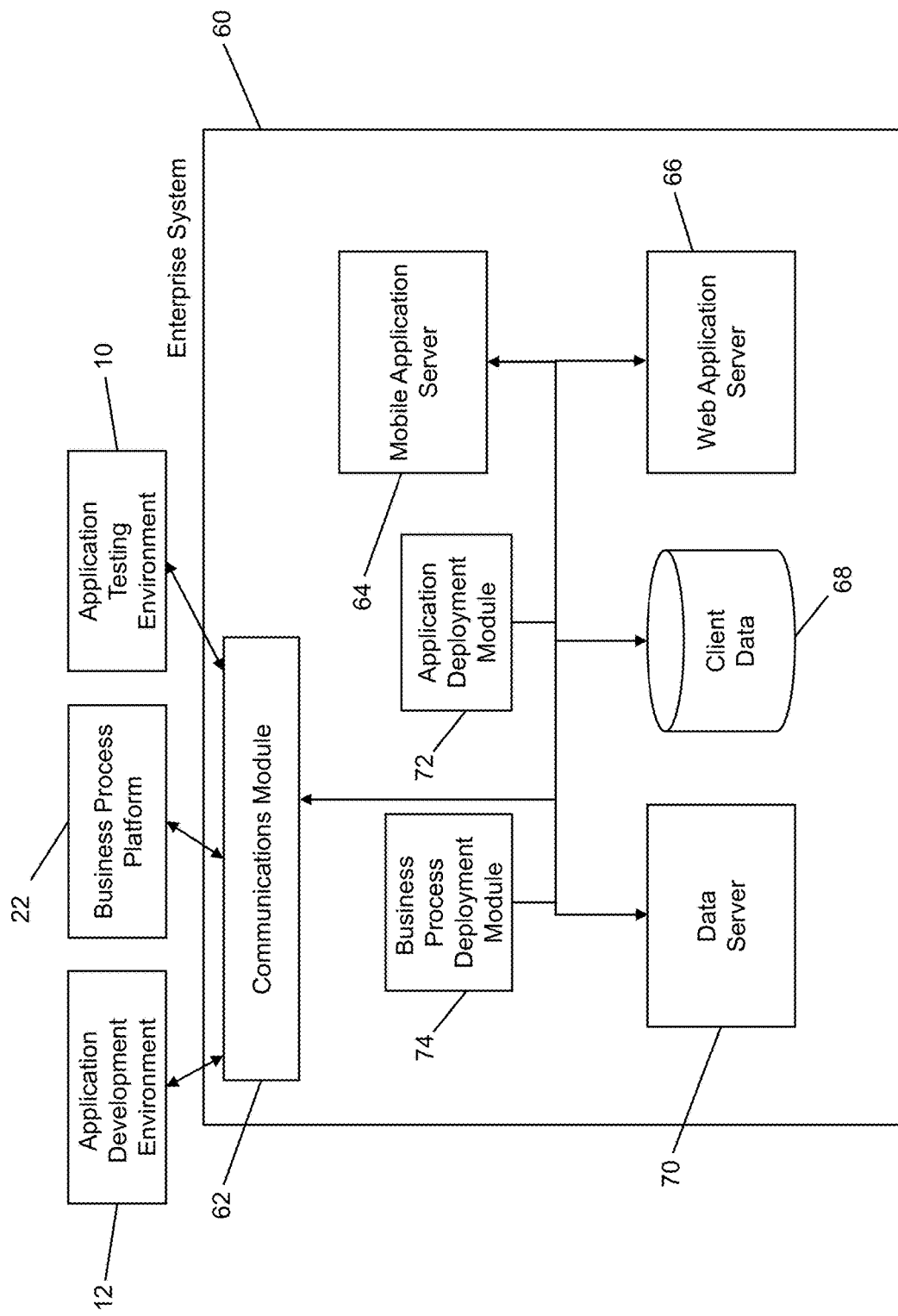
FIG. 3 is a block diagram of an example configuration of an enterprise system.

In FIG. 3, an example configuration of an enterprise system 60 is shown. The enterprise system 60 includes a communications module 62 that enables the enterprise system 60 to communicate with one or more other components of the computing environment 8, such as the application testing environment 10, business process platform 22, or application development environment 12, via a bus or other communication network, such as the communication network 14. While not delineated in FIG. 3, the enterprise system 60 includes at least one memory or memory device that can include a tangible and non-transitory computer-readable medium having stored therein computer programs, sets of instructions, code, or data to be executed by one or more processors (not shown for clarity of illustration). FIG. 3 illustrates examples of servers and datastores/databases operable within the enterprise system 60. It can be appreciated that any of the components shown in FIG. 3 may also be hosted externally and be available to the enterprise system 60, e.g., via the communications module 62. In the example embodiment shown in FIG. 3, the enterprise system 60 includes one or more servers to provide access to client data 68, e.g., for development or testing purposes. Exemplary servers include a mobile application server 64, a web application server 66 and a data server 70. Although not shown in FIG. 3, as noted above, the enterprise system 60 may also include a cryptographic server for performing cryptographic operations and providing cryptographic services. The cryptographic server can also be configured to communicate and operate with a cryptographic infrastructure. The enterprise system 60 may also include one or more data storage elements for storing and providing data for use in such services, such as data storage for storing client data 68.

Mobile application server 64 supports interactions with a mobile application installed on client device (which may be similar or the same as a test device). Mobile application server 64 can access other resources of the enterprise system 60 to carry out requests made by, and to provide content and data to, a mobile application on client device. In certain example embodiments, mobile application server 64 supports a mobile banking application to provide payments from one or more accounts of user, among other things.

Web application server 66 supports interactions using a website accessed by a web browser application running on the client device. It can be appreciated that the mobile application server 64 and the web application server 66 can provide different front ends for the same application, that is, the mobile (app) and web (browser) versions of the same application. For example, the enterprise system 60 may provide a banking application that be accessed via a smartphone or tablet app while also being accessible via a browser on any browser-enabled device.

The client data 68 can include, in an example embodiment, financial data that is associated with users of the client devices (e.g., customers of the financial institution). The financial data may include any data related to or derived from financial values or metrics associated with customers of a financial institution system (i.e. the enterprise system 60 in this example), for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices.

An application deployment module 72 is also shown in the example configuration of FIG. 3 to illustrate that the enterprise system 60 can provide its own mechanism to deploy the developed and tested applications onto client devices within the enterprise. It can be appreciated that the application deployment module 72 can be utilized in conjunction with a third-party deployment environment 16 such as an app store to have tested applications deployed to employees and customers/clients.

It will be appreciated that only certain modules, applications, tools and engines are shown in FIGS. 2 and 3 for ease of illustration and various other components would be provided and utilized by the application development environment 12 and enterprise system 60, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the application testing environment 10, application development environment 12, business process platform 22, enterprise system 60, or accessible or connectable thereto. Any application or module herein described may be implemented using computer readable/executable instructions that may be stored or otherwise held by such computer readable media.

Figure 4:
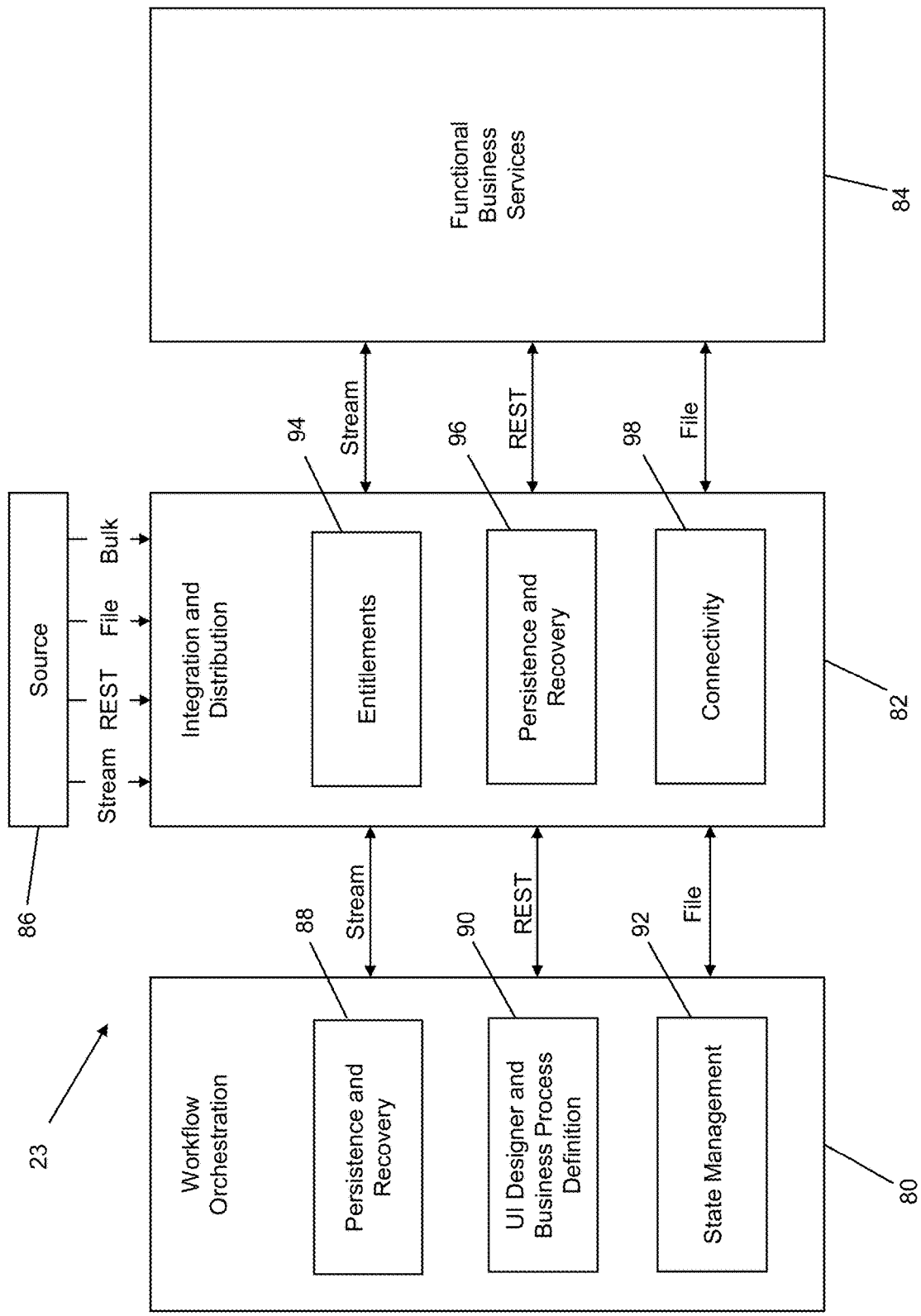
FIG. 4 is a block diagram of an example configuration of a workflow orchestration solution for a business process platform.

Referring to FIG. 4, a block diagram of an example configuration of a workflow orchestration system 23 for the business process platform 22 is shown. The configuration shown in FIG. 4 illustrates three components, workflow orchestration 80, integration and distribution 82, and functional business services 84. This configuration provides an implementation that is agnostic to functional services, which can be custom built or "off-the-shelf". The workflow orchestration 80 can include functionality to enable business process workflow design and visualization and the integration and distribution 82 can implement the business process workflows to meet certain business and technical objectives. As shown in FIG. 4, the workflow orchestration component 80 can include a persistence and recovery module 88, a UI designer and business process definition module 90, and a state management module 92. The integration and distribution component 82 includes an entitlements module 94, a persistence and recovery module 96, and a connectivity module 98. The components 80, 82, 84 can communicate with each other using various protocols and commands, for example, Stream, Representational State Transfer (REST), and File operations.

Also shown in FIG. 4 is a source component 86 that can integrate and/or communicate with the integration and distribution component 82 using Stream, REST, File and Bulk operations to provide data to the system 23. It can be appreciated that the workflow orchestration component 80 can be abstracted form the user via the state machine provided by the system 23. The UI designer module 90 allows for a business-function oriented approach to workflow design and, as discussed further below, enables the workflow to be represented as a graph. The streaming distribution layer (providing the Stream operations) offers a normalized paradigm for function integration and onboarding. Moreover, the system 23 includes resiliency for persistence and recovery in multiple tiers.

Figure 5:
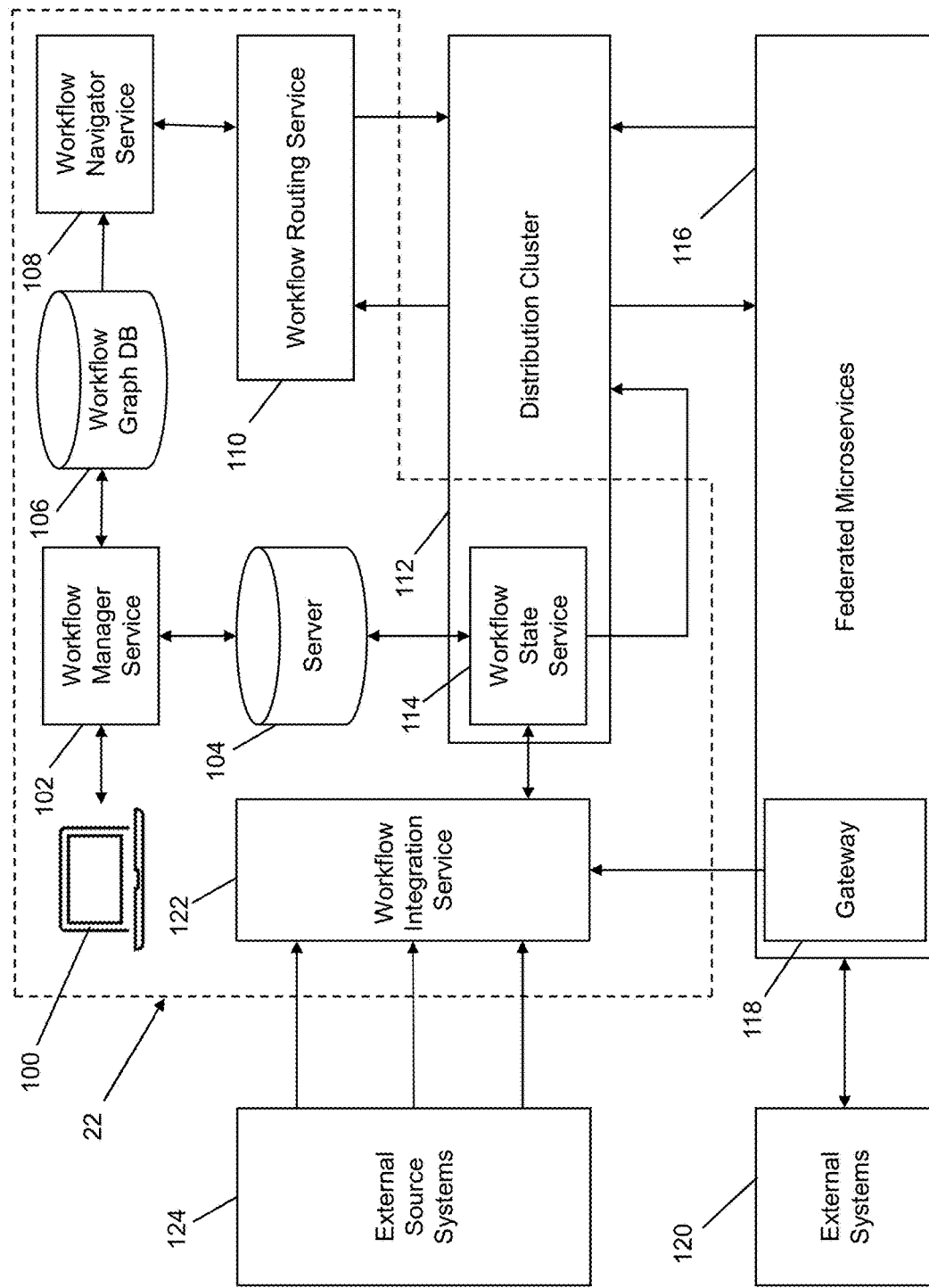
FIG. 5 is a block diagram of an example configuration of a business process platform deployed in a computing environment.

Referring now to FIG. 5, a block diagram illustrating an example of a configuration for the business process platform 22 is shown. The business process platform 22 is configured to visualize, define, and implement a business process as a graph. The platform 22 enables dynamic routing and functional declarations for application onboarding. The platform 22 also provides a standard integration mechanism to facilitate a federated build of the processes using a microservice layer. Message persistence can occur in a queue and graph database for recovery. The UI functionality, described in greater detail below, allows for a low- or no-code implementation of the process from building blocks available to the platform 22. This also enables the platform 22 to be integrated with process automation tools.

The platform 22 in the configuration shown in FIG. 5 includes a workflow manager 100 that uses a workflow manager service 102 to determine and display currently executing workflows as well as to define workflows as a graph. The workflow manager service 102 is connected to a workflow graph database 106. An example of an implementation for the workflow graph database 106 can include a Neo4j database, which is considered to be efficient in querying complex graphs. The workflow graph database 106 can unlock value from data relationships to facilitate the creation of electronic products and services and/or to enhance existing electronic products and services. In comparison to a relational database, a graph database 106 can model and store data and relationships with less complexity and can avoid the need to redesign schema when new types of data and/or relationships are added. These attributes make the use of a graph database 106 particularly advantageous for master data management, network and IT operations, graph-based searches, identity and access management, fraud detection, recommendations and social capabilities.

The workflow manager service 102 is also configured to store the workflow graphs in such a workflow graph database 106. A workflow navigator service 108 can load a workflow graph instance from the graph database 106 and interact with a workflow routing service 110 to determine and execute the next workflow task. The workflow routing service 110 queries the workflow navigator service 108 for the next workflow task according to the graph. The workflow routing service 110 also interfaces with a distribution cluster 112 to egress or ingress a topic and coordinate with one or more federated microservices 116.

The distribution cluster 112 can also use the workflow routing service 110 to subscribe to ingress the topic for the current task such that the routing service 110 receives a document for the current task. Here, the state of the workflow is given by the topic position. The routing service 110 also updates the document and publishes a workflow state change egress topic for the current task, e.g., by attaching a dynamic routing header.

The distribution cluster 112 includes or otherwise accesses a workflow state service 114 (e.g., using Pulsar functionality) to map the external ingress to internal ingress topics as well as to map the internal egress to external egress topics. The workflow state service 114 also validates and logs the published document and the workflow state change in a server 104 that is accessed by the workflow manager service 102 to display the currently executing workflow as noted above.

The distribution cluster 112 is coupled to a set of federated microservices 116 to provide the flexibility of onboarding functional microservices for extensions. For example, web publication, time series tools, and real-time monitoring can be onboarded. These microservices 116 can also be leveraged in other workflows, providing modularity to an organization that employs the system across a number of business workflows. The distribution cluster 112 interacts with the federated microservices 116 to enable a client to subscribe to egress a topic. The client can also post from the federated microservices 116 to the distribution cluster 112 to ingress a topic.

Examples of such microservices that can be utilized by a financial institution include, without limitation: payments, money transfer generation, wire enrichment, credit/liquidity service, fraud/anti-money laundering, accounting service, limits management, supplemental income routing service, business rules and reference management, approval service, alerts/email service, reconciliation service (matching), and document generation.

The federated microservices 116 can include a gateway 118 to communicate with external systems 120 as needed as well as to communicate with a workflow integration service 122 in the platform 22. The workflow integration serviced 122 can communicate with external source systems 124 such as external web services, drop copy services and external databases to allow external systems to publish documents. Similarly the integration service 122 can pick up data from a files dropped to a drop copy service or from a database.

Figure 6A:
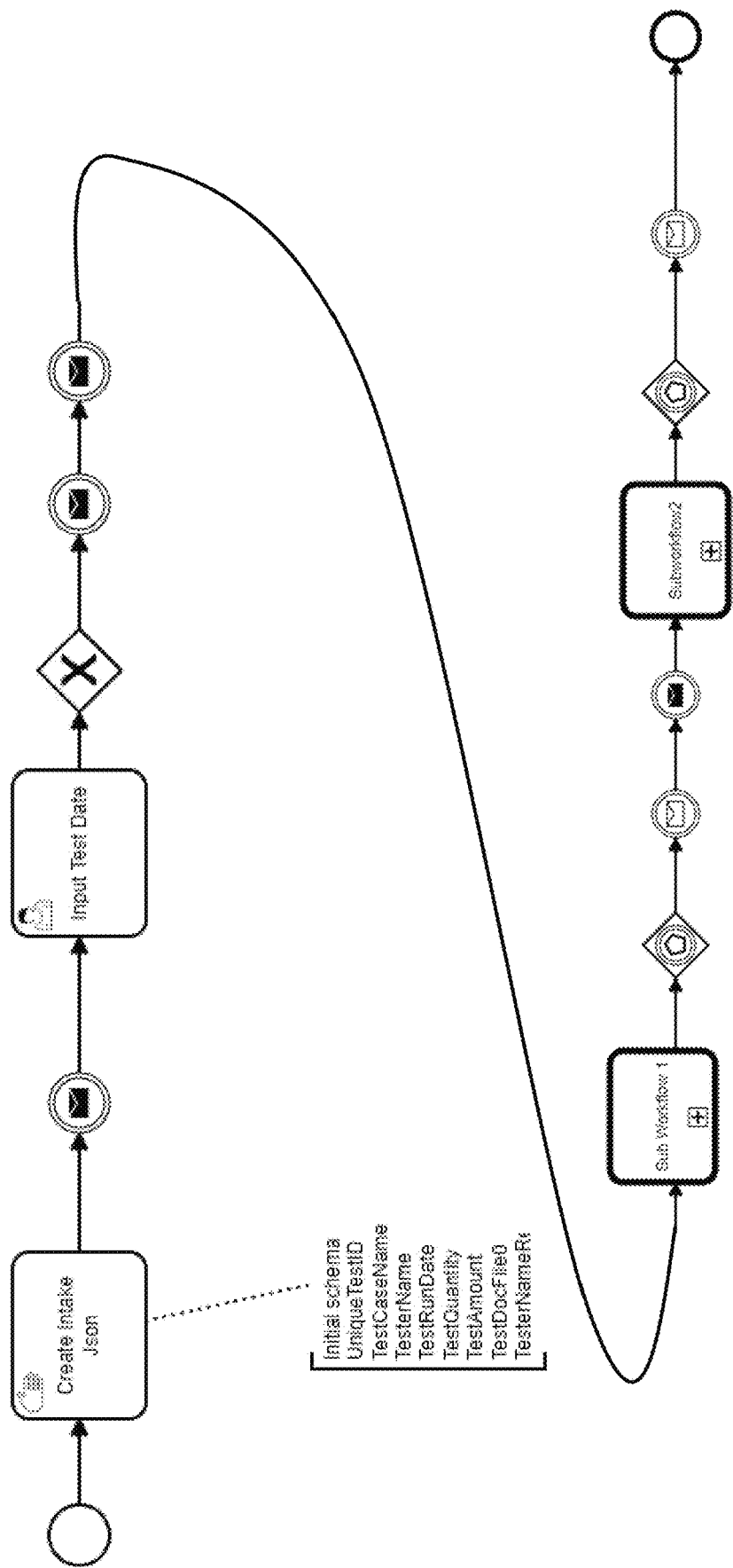
FIGS. 6a-6d are examples of business process workflows.
Figure 6B:
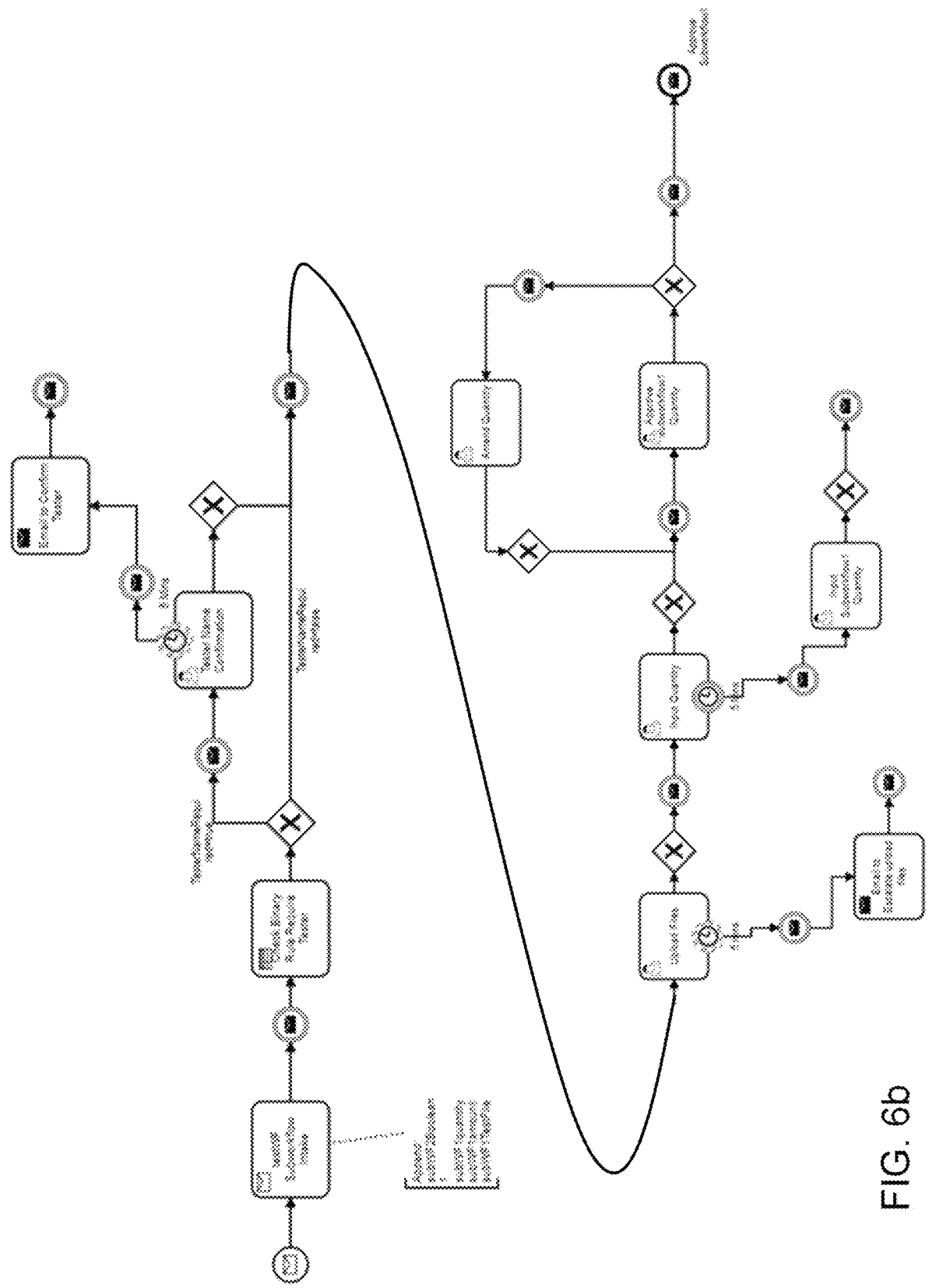
Figure 6C:
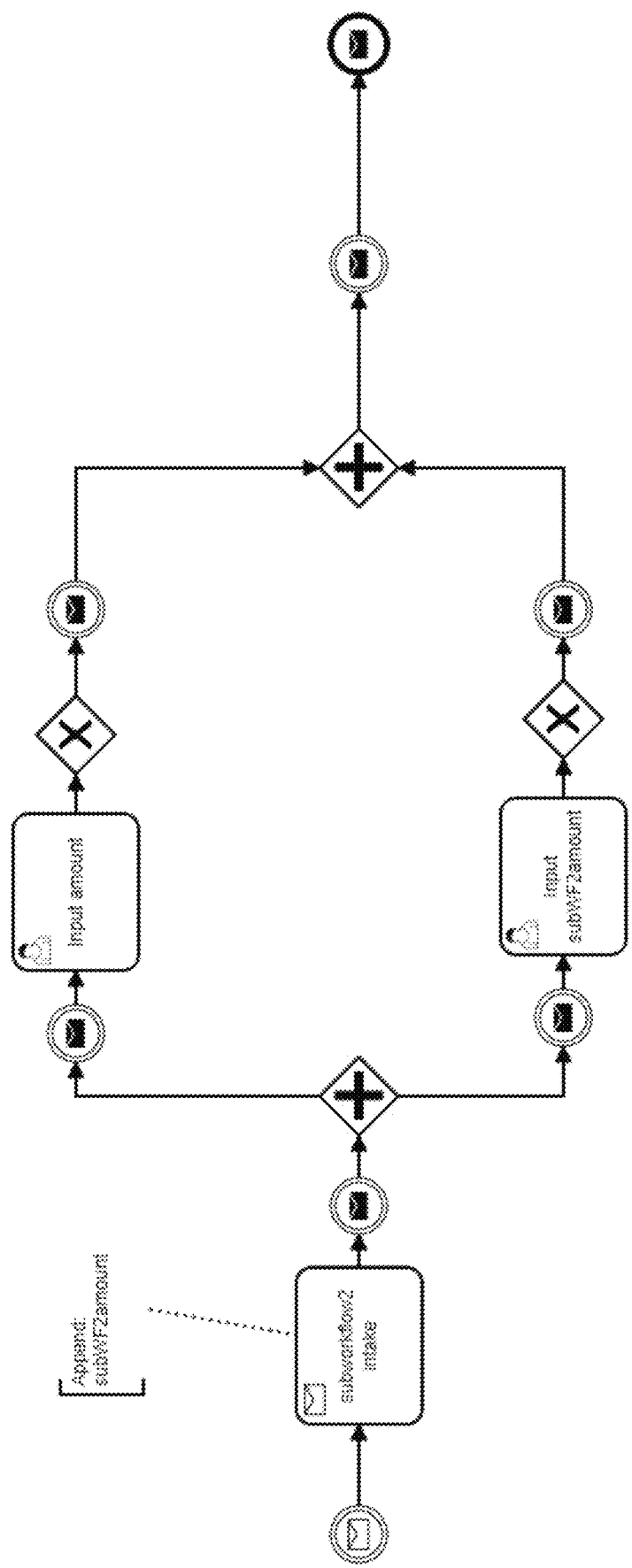

FIGS. 6a-6c illustrate a process workflow as a graph. As shown in FIG. 6a, the process includes a number of nodes that proceed through the business process and can include multiple sub-workflows that can each be constructed in a similar way. Various communication nodes are illustrated to indicate when the process passes between different parties by way of, for example, an email. The sub-workflows are shown in FIGS. 6b and 6c. Sub-workflow 1 shown in FIG. 6b includes various email, upload, input, and amend operations that are steps in the business workflow that are now captured and controlled according to the graph. As noted above, this allows the state of the workflow to be inferred from the position in the graph. Sub-workflow 2 shown in FIG. 6c illustrates a sub-process in which two parallel input operations are performed.

Figure 6D:
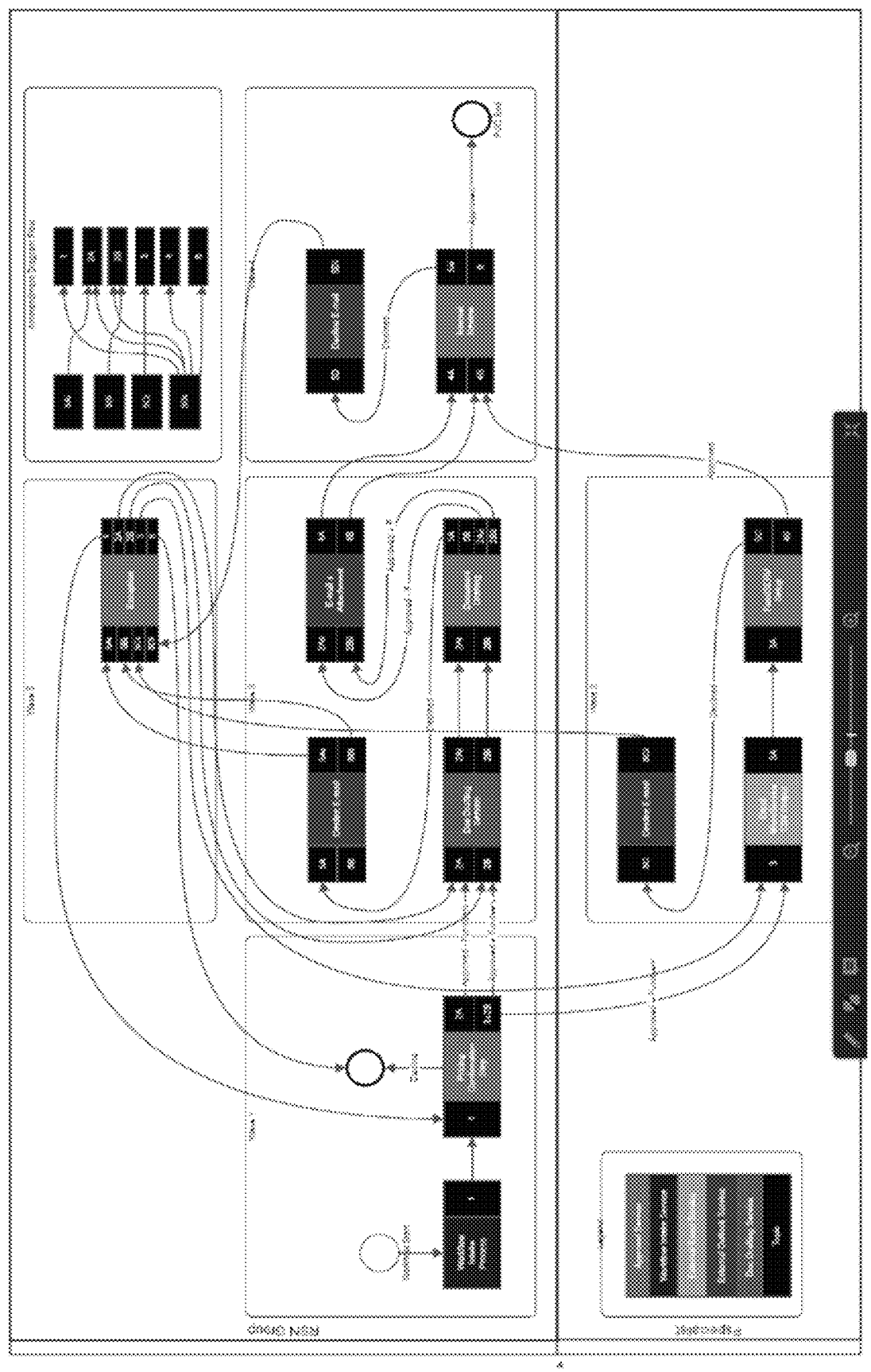

FIG. 6d illustrates another process workflow as a graph, in this example including distribution, issuance, and approval for a structured notes workflow. The process in this example includes approval of the structure and intent to sell, distributor selection and routing, document drafting (prospectus, etc.), and final approval. It may be noted that the graph structure facilitates parallelization, amendments, and automated alerts.

By utilizing a graph structure for the business process workflow, the topic (issued via the distribution cluster 112) implies the state and thus processes do need to be linear. This graphical representation also permits graphs to be chained together, allowing for sub-flows as discussed above. Documents in the process can pass through the workflow via the graph edges to microservices and users that receive and/or interact with the document (e.g., to add a signature).

Figure 7:
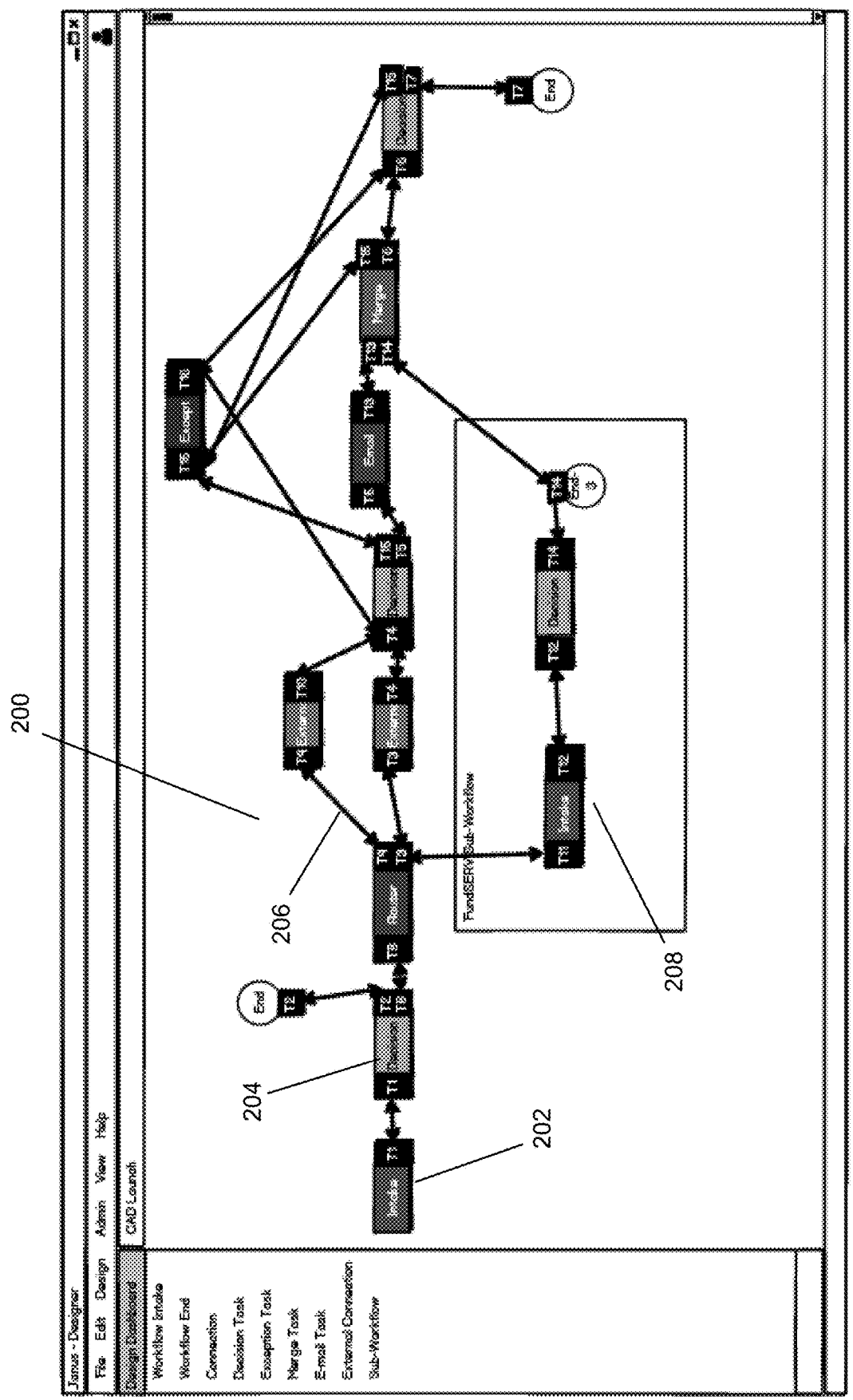
FIG. 7 is an example of a user interface for designing a business process workflow.

FIG. 7 is an example of a user interface 200 for designing a business process workflow. The user interface 200 provides a "canvass" with an example of a graph that has been built from a number of nodes and indicating various tasks. Each block 202 added to the user interface 200 can represent a node in the workflow and can be connected to other blocks 202. The connection points 204 between nodes and edges can be considered tasks 206. The illustrated graph also includes a sub-workflow 208 that can be defined separately and reused where applicable in other workflows. It can be appreciated that by representing a workflow as a graph and storing same in a graph database, designing and visualizing the workflow is facilitated by connecting blocks 202 (nodes) and tasks 206 (edges). This allows the topic associate with a node to imply the state of the workflow at any given time in the process, while enabling not linear workflows to be implemented (e.g., to obtain multiple signature or contributions to a document in the workflow). Moreover, the graph structure facilitates onboarding the microservices 116 by associating the microservices 116 with tasks 206, connection points 204, or blocks 202 in the graph. In this way, the user interface 200 provides an intuitive way to build the workflow, with different types of nodes available from a library, e.g., "intake", and "decision" as shown in FIG. 7. The workflow, once designed in this way, can be exported to an XML or similar file format to provide an output that can be used to create the graph structure to be stored in the graph database 106.

Figure 8:
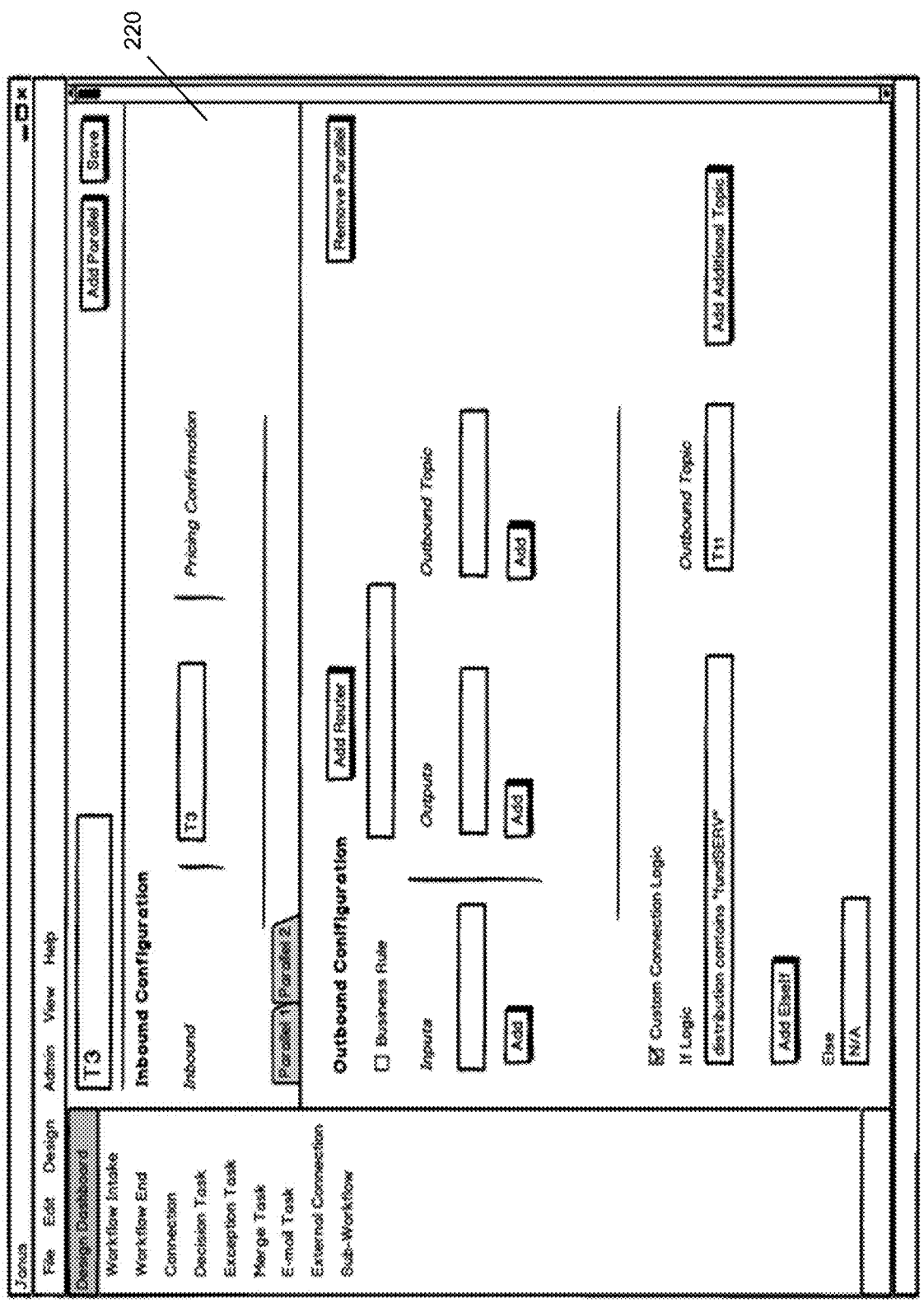
FIG. 8 is an example of a design dashboard user interface for designing a business process workflow.
Figure 9:
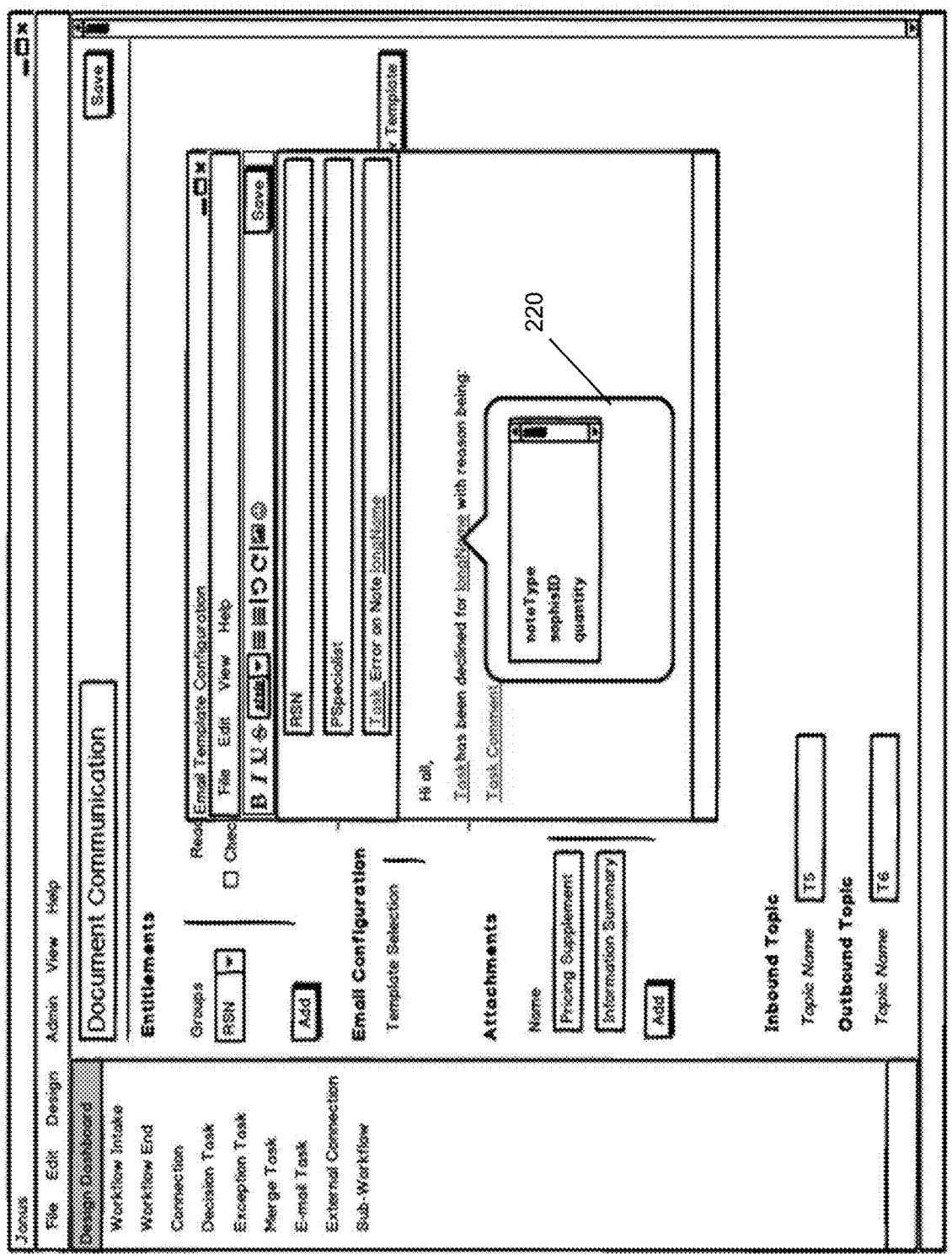
FIG. 9 is an example of a document communication dashboard user interface for defining communication configurations for communications integrated into a business process workflow.

FIG. 8 is an example of a design dashboard 220 user interface for designing a business process workflow. The dashboard 220 enables users to drill down into a topic and define inbound and outbound configurations, including applying business rules and defining inputs and outputs. For example, as shown in FIG. 9, a document communication configuration tool 230 can also be provided, which enables users to define email template configurations for communications that are integrated into the workflow. It can be appreciated that the dashboard user interfaces 200, 220 can also provide other dashboards, such as a workflow dashboard showing multiple workflows and sub-workflows with administrative tools and the ability to publish a workflow once designed. The UI design tool can integrate with an underlying state machine provided by the business process platform 22 to store the published workflow as a graph and traverses the graph, distribute/exchange documents, and employ microservices according to the implied state of the graph as discussed above.

Figure 10:
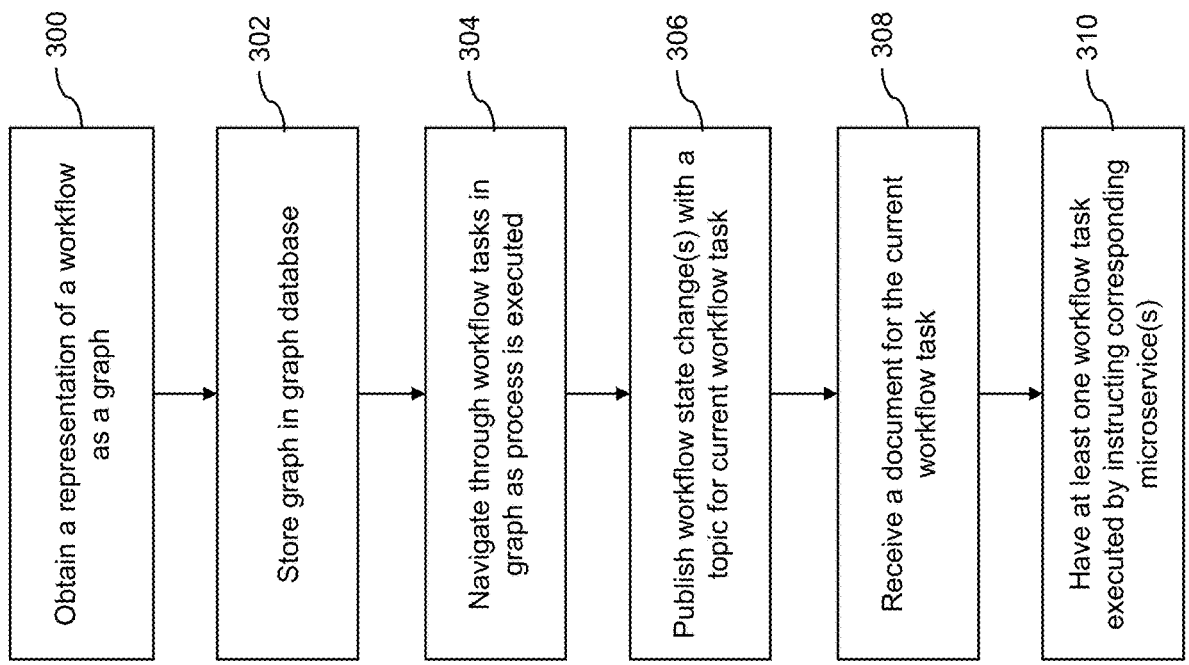
FIG. 10 is a flow diagram of an example of computer executable instructions for executing a process workflow.

Referring to FIG. 10, an example embodiment of computer executable instructions for executing a process workflow using the business process platform 22 is shown. At block 300, the business process platform 22 obtains a representation of a workflow as a graph. This can be obtained from an external source or created using the user interface 200. It can be appreciated that, as discussed above, the user interface 200 can be provided as a tool in the business process workflow UI 24 that is integrated in the application development environment 12 of an enterprise system, or can be provided as a stand-alone tool. At block 302 the graph is stored in the graph database 106. The graph includes a configuration of microservices and other operations that are triggered or implied by the state of the graph and the platform 22 can navigate through the workflow tasks in the graph as the process is executed at block 304, by using the workflow navigator service 108, the workflow routing service 110, the distribution cluster 112 and by accessing the federated microservice(s) 116 according to the configuration implied by the graph.

At block 306 the workflow state change(s) can also be published with a topic for the current workflow task. This implies the state of the state machine implemented by the business process platform 22 and allows operations associated with the workflow to be controlled and implemented, e.g., having a document signed, verifying a payment, etc. At block 308 a document for the current workflow task, such as a form being filled out or a transaction being completed is received or otherwise handled by the business process platform 22. At block 310, at least one workflow task is executed by instructing a corresponding microservice 116. It can be appreciated that blocks 304, 306, 308, and 310 can be done in parallel or linearly depending on the configuration of the workflow and by storing the workflow as a graph the execution of the workflow is not constrained by a linear flow. That is, multiple workflow topics or tasks can be implemented in parallel without departing from the progression of the workflow being executed.

Figure 11:
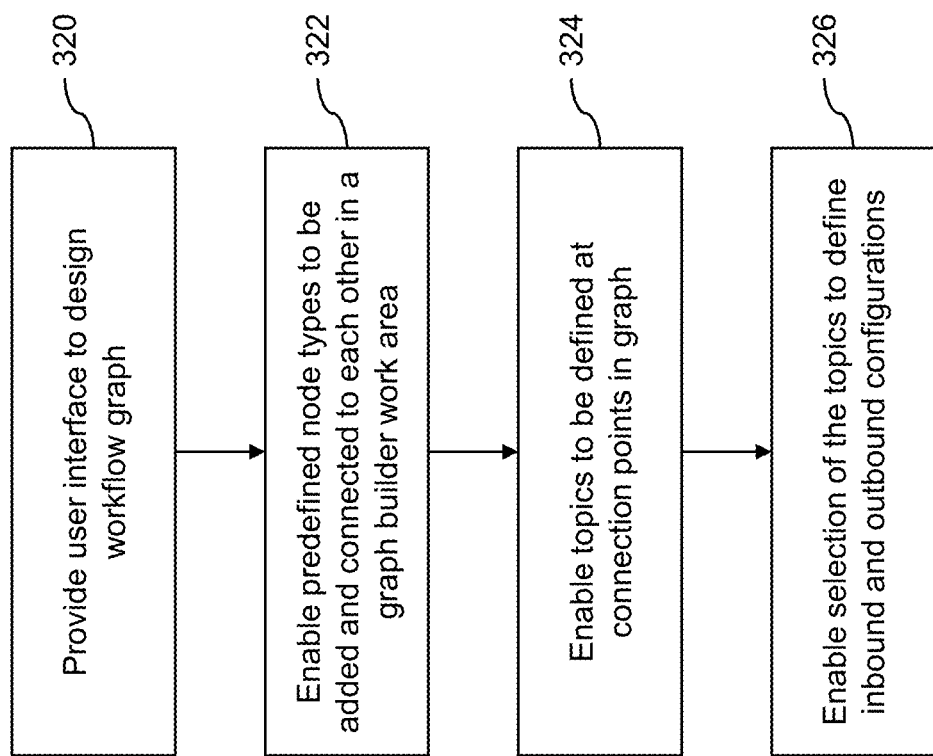
FIG. 11 is a flow diagram of an example of computer executable instructions for designing a business process workflow.

FIG. 11 is a flow diagram of an example of computer executable instructions for designing a business process workflow, e.g., using the user interface 200. At block 320, the user interface 200 is provided to a user to enable the workflow graph to be designed, e.g., as shown in FIG. 7. At block 322, predefined node types can be added and connected to each other in a graph builder work area or canvass as described above. This enables the workflow visualization shown in FIG. 7 and ultimately as shown in FIG. 6 for a complete workflow. At block 324, topics can be defined at the connection points in the graph, with edges representing tasks to be executed. The topics imply the state of the process and can inform the state machine provided by the business process platform 22. At block 326, the user interface 200 can allow selection of the topics to define inbound and outbound configurations, as shown in FIGS. 8 and 9 described above. In this way, the user interface 200 provides a tool to allow users to visualize, design, and ultimately implement a business process workflow as a graph that is then stored as a graph to intuitively inform the user or other administrators of the workflow of the progress and states associated with the workflow.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for executing process workflows, the server device comprising:
   a processor;
   a communications module coupled to the processor; and
   a memory coupled to the processor, the memory storing computer executable instructions that when executed by the processor cause the processor to:
   obtain via the communications module, a representation of a workflow as a graph, the graph comprising a plurality of interconnected workflow tasks;
   store the graph in a graph database;
   navigate through the workflow tasks in the graph as the process is executed;
   publish via the communications module, a workflow state change with a topic for the current workflow task;
   receive via the communications module, a document for the current workflow task, wherein a state of the process is implied by the topic position in the graph, and wherein the topic determines at least one microservice to be employed; and
   have at least one workflow task associated with the current workflow task executed by instructing a corresponding one or more microservices via the communications module.

2. The server device of claim 1, wherein the computer executable instructions further cause the processor to:
   access a workflow manager service to define the workflow as the graph, and to display a currently executing workflow.

3. The server device of claim 1, wherein the computer executable instructions further cause the processor to:
   use a workflow routing service to publish the workflow state change and to receive the document via a distribution cluster coupled to a group of federated microservices.

4. The server device of claim 3, wherein the computer executable instructions further cause the processor to:
   use a workflow navigator service to communicate between the workflow graph database and the workflow routing service to communicate with the distribution cluster.

5. The server device of claim 1, wherein the computer executable instructions further cause the processor to:
   communicate via the communications module with a plurality of external source systems to publish documents, obtain data from files, and to obtain data from an external database.

6. The server device of claim 1, wherein the computer executable instructions further cause the processor to:
   integrate with an application development environment to tie the process workflow to an enterprise application.

7. The server device of claim 6, wherein the enterprise application is provided by a financial institution.

8. The server device of claim 1, wherein the computer executable instructions further cause the processor to:
   provide a user interface to design the workflow graph;
   enable predefined node types to be added and connected to each other in a graph builder work area in the user interface;
   enable topics to be defined at connection points in the graph; and
   enable selection of the topics to define inbound and outbound configurations.

9. The server device of claim 8, wherein the computer executable instructions further cause the processor to:
   provide at least one communication template to enable communications in the workflow to be defined.

10. The server device of claim 8, wherein the computer executable instructions further cause the processor to:
    provide a dashboard for managing a plurality of workflows, and to enable designed workflows to be published.

11. The server device of claim 8, wherein the computer executable instructions further cause the processor to:
    enable sub-workflows to be created and shared across multiple workflows designed using the user interface.

12. A method of executing process workflows, the method executed by a device having a communications module and comprising:
    obtaining via the communications module, a representation of a workflow as a graph, the graph comprising a plurality of interconnected workflow tasks;
    storing the graph in a graph database;
    navigating through the workflow tasks in the graph as the process is executed;
    publishing via the communications module, a workflow state change with a topic for the current workflow task;
    receiving via the communications module, a document for the current workflow task, wherein a state of the process is implied by the topic position in the graph, and wherein the topic determines at least one microservice to be employed; and
    having at least one workflow task associated with the current workflow task executed by instructing a corresponding one or more microservices via the communications module.

13. The method of claim 12, further comprising:
accessing a workflow manager service to define the workflow as the graph, and to display a currently executing workflow.

14. The method of claim 12, further comprising:
using a workflow routing service to publish the workflow state change and to receive the document via a distribution cluster coupled to a group of federated microservices.

15. The method of claim 14, further comprising:
using a workflow navigator service to communicate between the workflow graph database and the workflow routing service to communicate with the distribution cluster.

16. The method of claim 12, further comprising:
communicating via the communications module with a plurality of external source systems to publish documents, obtain data from files, and to obtain data from an external database.

17. The method of claim 12, further comprising:
integrating with an application development environment to tie the process workflow to an enterprise application.

18. The method of claim 12, further comprising:
providing a user interface to design the workflow graph;
enabling predefined node types to be added and connected to each other in a graph builder work area in the user interface;
enabling topics to be defined at connection points in the graph; and
enabling selection of the topics to define inbound and outbound configurations.

19. The method of claim 18, further comprising:
enabling sub-workflows to be created and shared across multiple workflows designed using the user interface.

20. A non-transitory computer readable medium for executing process workflows, the computer readable medium comprising computer executable instructions for:
obtaining via a communications module, a representation of a workflow as a graph, the graph comprising a plurality of interconnected workflow tasks;
storing the graph in a graph database;
navigating through the workflow tasks in the graph as the process is executed;
publishing via the communications module, a workflow state change with a topic for the current workflow task;
receiving via the communications module, a document for the current workflow task, wherein a state of the process is implied by the topic position in the graph, and wherein the topic determines at least one microservice to be employed; and
having at least one workflow task associated with the current workflow task executed by instructing a corresponding one or more microservices via the communications module.

* * * * *